UNITED STATES PATENT OFFICE.

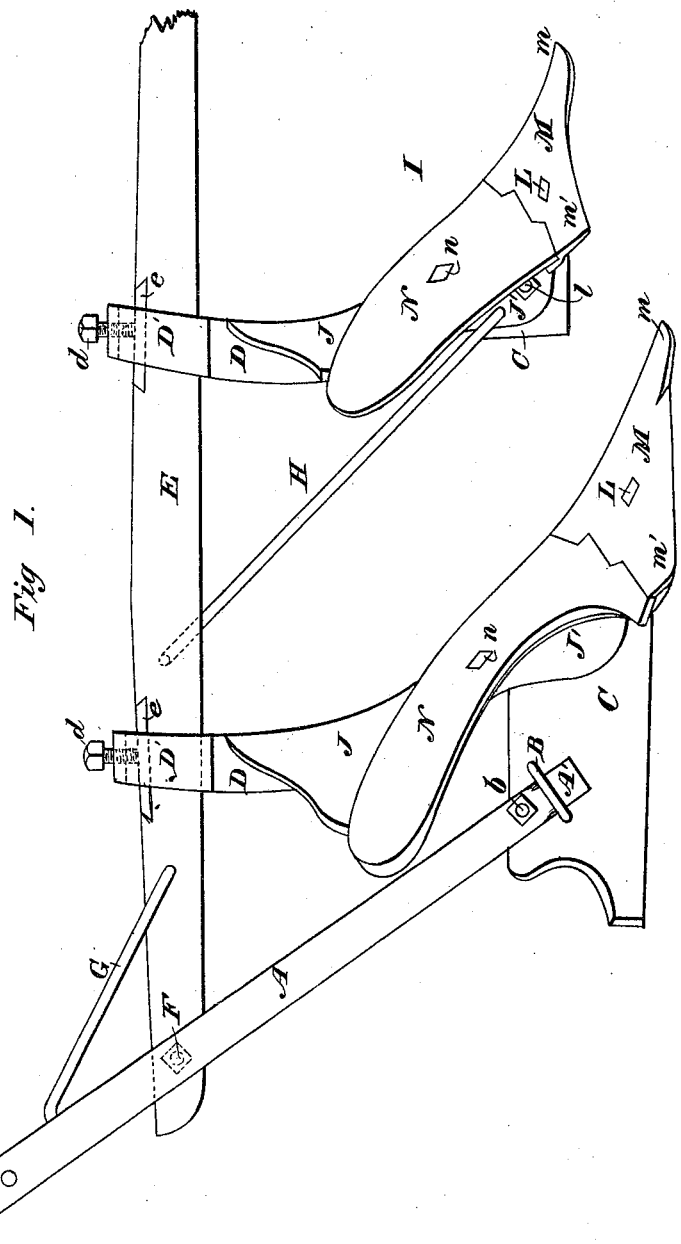

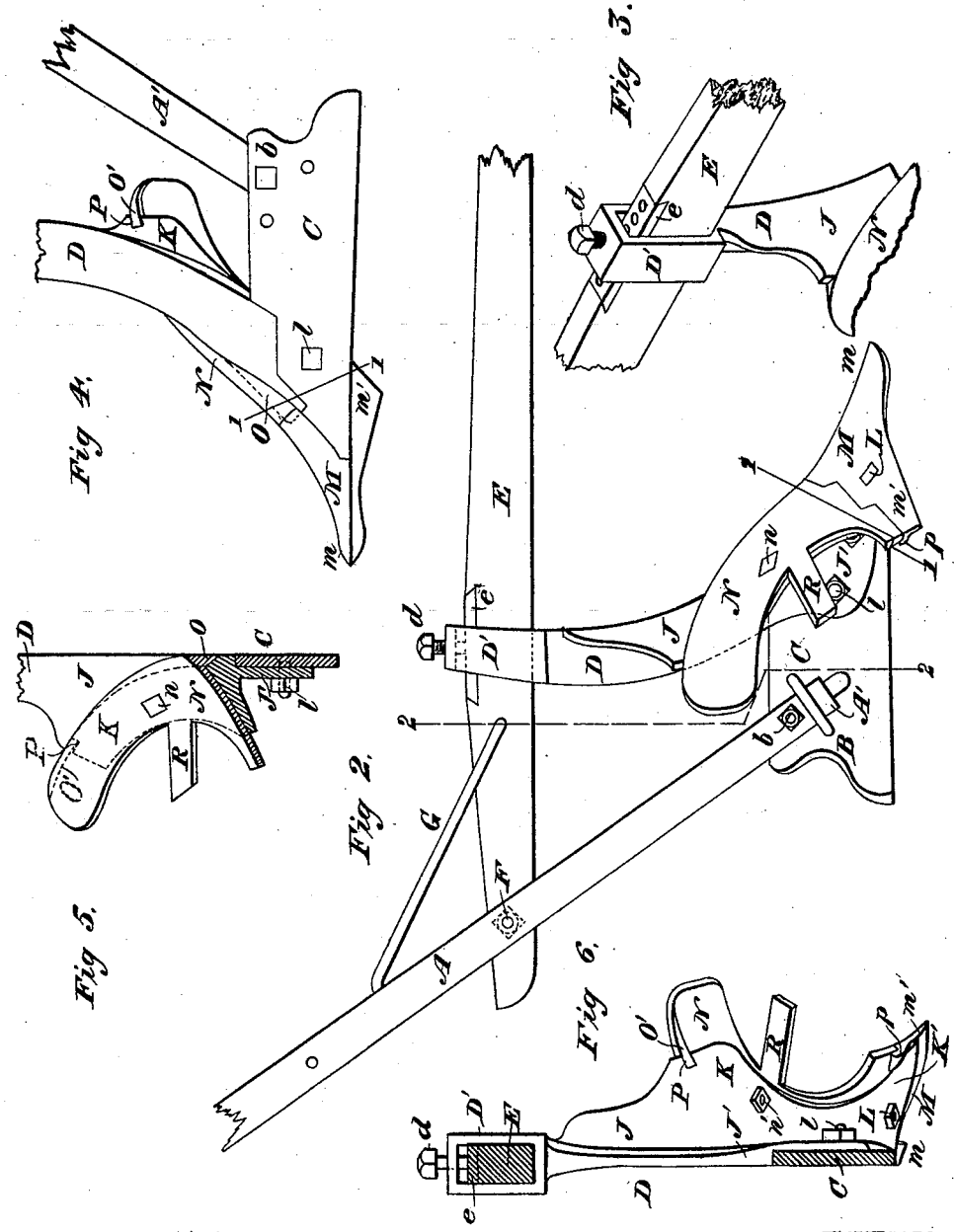

CHARLES W. FLIPPEN, OF DANVILLE, VIRGINIA.

IMPROVEMENT IN PLOWS.

Specification forming part of Letters Patent No. 185,437, dated December 19, 1876; application filed October 19, 1876.

*To all whom it may concern:*

Be it known that I, CHARLES W. FLIPPEN, of Danville, in the county of Pittsylvania and State of Virginia, have invented certain new and useful Improvements in Plows, of which the following is a specification:

My invention mainly relates to a plow of that class in which the depth of plowing, or extent to which the plow has a tendency to enter the ground while properly working, is regulated by adjusting the plow-beam and plow relatively to each other, so as to change the inclination at which the plow share or point works. It also relates to a plow in which a single standard or frame for the attachment of the land-side, mold-board and share, and their connection to the beam, is adapted to have secured to it various kinds and sizes of mold-boards and shares, whereby the style of plow is changed so as to render it suitable for different kinds of work, such as subsoil plowing, cultivating, and turning. My invention further relates to a peculiar construction of the mold-board to adapt it for pulverizing the soil.

The improvements claimed consist of certain novel constructions and combinations of parts, hereinafter particularly set forth, whereby a strong connection between the plow proper and the beam, and ready adjustment of these parts relatively to each other, are attained, and plows of light or heavy draft and for various kinds of work adapted to be secured to a common beam and handles.

In the accompanying drawings, Fig. 1 represents a side elevation of a double plow adapted for surface and subsoil plowing, with a portion of the beam removed and the upper ends of the handles broken away. Fig. 2 is a similar view of a single plow with the mold-board for turning a furrow and partially pulverizing or breaking the slice beneath the sod. Fig. 3 is a view, in perspective, of the upper end of the plow-standard, with its collar, and a section of the plow-beam, showing the manner in which the standard and parts secured thereto, constituting the plow proper, are adjustably secured to the beam. Fig. 4 is a view, in elevation, of the plow as seen from the land-side side of the plow, showing the connection between the upper end of the mold-board and the plow-standard seat or or frame, the dotted lines representing the joint between these parts at the lower front or cutting edge of the mold-board. Fig. 5, a front elevation, partly in section, on the line 1 1 of Figs. 2 and 4, showing clearly the lower connection between the standard and mold-board, and representing by dotted lines the mold-board seat formed with the standard and the upper connection of the mold-board therewith. Fig. 6 is a section, the line 2 2 of Fig. 2 showing a rear view of the standard and plow proper.

The handles A A' are secured at their lower ends to the plow by means of a loop or staple, B, on the inside of the land-side C, near the heel, and a bolt, $b$, in a well-known way. Other equivalent ways of connecting the land-side and lower united ends of the handles in such manner as to allow the land-side to rock vertically to a slight extent, for a purpose hereinafter explained, may be adopted. A standard or frame, D, to which the land-side, share, and mold-board are secured, projects upward, as usual, and terminates at its upper end in a socket or collar, D', which embraces the beam E, and is adjustable thereon.

The interior area or size of the opening through the collar about corresponds with, or is but slightly greater transversely than, the width or thickness horizontally of the plow-beam, so that the collar, while capable of being freely slid back and forth upon the beam to adjust the plow, fits snugly enough against its sides to prevent all twisting or lateral motion of the standard upon the beam. The height or vertical area of the socket or collar opening is somewhat greater than the depth or thickness vertically of the beam.

A set-screw or pinch-bolt, $d$, passes through a tap or female screw in the top of the collar D', and engages with one or another of a series of holes in a metal plate, $e$, countersunk in the top of the beam. In this manner the adjustable collar on the standard may be secured in the desired position on the plow-beam. Screws in the sides of the collar may also be used, if desired.

The plow-beam E is secured at its rear end to one of the handles by a screw-bolt, F, or in other well-known way; and a diagonal brace, G, passes from the beam to the other handle, as usual. Movement of the beam independently of the handles is thus prevented.

To adjust the plow for deep work the collar is moved toward the front end of the beam, thus rocking the plow on the joint between the land-side and lower end of the handles, and depressing the share or point. The set-screw is then tightened to secure the standard and plow in position. If shallow work or light plowing is to be done the set-screw is loosened, the collar slid backward, thus elevating the plow-point, and the set-screw made fast to lock the collar upon the beam.

From the foregoing description it will be seen that a strong, simple, and readily-adjustable connection is made between the beam and the standard and frame D, and parts secured thereto, constituting the plow proper, and that all that it is necessary to do to remove the standard and its attachments from the beam and handles, to admit of the substitution of a heavier or lighter plow, is to remove the bolt $b$ connecting the lower ends of the handles and land-side, loosen or remove the pinch-bolt or set-screw $d$, slip the land-side from the loop B, and slide the collar D' along the beam and off at its end.

For very deep or subsoil plowing two plows are attached to the same beam, one to turn the sod and the other to loosen the earth at a greater depth, as is well understood. By the collars and set-screws the two plows may readily be secured to the beam, as shown in Fig. 1. An inclined brace, H, passes from the heel of the land-side of the front plow I to the beam. The front or turning plow may be adjusted by rocking it on the brace and sliding the standard-collar on the beam. Thus the two plows are independently adjustable.

The standard D is formed or cast with an inward-curved side projection, J, the front surface of which lies flush with and forms a section of the mold-board with which it joins, so as to make a smooth close joint. At the line of juncture between the outer or exposed surface of the section J and mold-board the standard is shouldered or recessed, so as to project backward or away from the outer surface a distance equal to the thickness of the mold-board, and then extends sidewise or inward, forming a lateral projection, K, from which it is curved downward and again inward, or away from the land-side, forming another lateral projection, K', at its lower end. The main part of the standard is formed with rearwardly-projecting strengthening flange or rib, J'. The outside of the standard, near its bottom, is shouldered or recessed, so as to project inward a distance equal to the thickness of the land-side, which is secured to the standard by a bolt, $l$, and nut, and by suitable interlocking teeth or projections and notches, so as to be flush on its outer surface with the outer surface of the standard, as usual. The bolt $l$ passes through the rearwardly-projecting flange J', beneath and behind the mold-board seat or frame formed with the standard.

A share, M, having a point, $m$, and ring $m'$, as usual, is secured to the lower side projection K' of the mold-board seat by a bolt, L, the head of which is countersunk.

Mold-boards of various kinds, adapted to fallowing or turning furrows, to cultivating or loosening the soil, to subsoil plowing, and to both turning furrows or slices and loosening or breaking the soil beneath the sod, are provided each with a bolt-hole and countersink, to adapt each one to receive a headed bolt, $n$, which passes through the standard-seat for the mold-board, and is secured by a nut, $n'$. Shares of various sizes are provided, each having a hole for the bolt L, so as to render them interchangeable, and are formed with notches and projections to fit corresponding notches and projections on the lower edge of the mold-board, as shown. The lower portion of the front edge of each mold-board N is formed with a rearwardly-projecting flange or lip, O, beveled or rounded on its inner side to fit snugly against the correspondingly-shaped portion of the standard D above the share. This flange O extends upward from the share about to the mold-board section J of the standard, and serves, in connection with the bolt $n$ and a lip or ridge, O', on the rear of the mold-board, to securely fasten the mold-board in place and yet admit of its ready separation from the standard by simply removing the single bolt $n$. This lip O', it will be seen, is formed upon the rear side of the top of the mold-board, and fits snugly in a notch, P, in the upper portion of the projection K of the mold-board seat just at the inner termination of the portion J of the standard, which forms a section or continuation of the mold-board. The lower edge or point of the standard D fits in a socket or recess formed in the share, while the end or extreme inner portion of the lower side projection K' of the mold-board seat fits close to or against a rearwardly-projecting lip, $p$, on the end of the wing $m'$. This lip fits beneath and against the mold-board, and braces its lower corner, which extends beyond the standard-seat.

For the purpose of partially pulverizing or breaking the soil beneath the sod as the slice or furrow is being turned, I provide a short arm or outward projection, R, on the mold-board, as clearly shown. As the slice is being raised and turned by the mold-board, the action of this arm upon the under side of the slice (or that part which becomes the top when the slice has been completely turned) is such as to partially pulverize the soil in some cases by removing portions of it from the roots of the grass, &c., while in other soils numerous breaks or interstices only are caused; but even this cracking or partial separation into fragments of the slice beneath the sod, which broken portion becomes the top or exposed surface of the slice when turned and left by the plow, aids materially in the preparation of the ground for crops.

I am aware that plows have heretofore been constructed with a series of arms or rods for completely pulverizing the soil, and do not, therefore, claim a plow so constructed; but I am not aware of any plow, prior to my invention, having a mold-board provided with a projection for operating upon the soil during the formation of the furrow in such manner as to break or pulverize the soil beneath the sod and turn the slice, with its partially separated or broken surface, upward.

I claim as my invention—

1. The combination, substantially as hereinbefore set forth, of the handles, the beam secured thereto, and having no movement independently thereof, the plow-standard, the parts secured thereto, constituting the plow proper, and the collar upon the standard, adjustable back and forth upon the beam, to rock the plow without disturbing the beam, for the purpose set forth.

2. The combination, substantially as hereinbefore set forth, of the beam, the handles jointed to the land-side of the plow, the standard, its collar, and the set-screw, whereby the depth of plowing may be regulated by rocking the plow upon the handles and sliding the collar upon the beam.

3. The combination of the standard, constructed as described, with a seat for the mold-board, and provided with the notch P in the projection K, the mold-board having the lip O' and the flange O, and the single bolt passing through the mold-board and standard, these members being constructed and operating substantially as set forth, for the purpose specified.

4. The hereinbefore-described mold-board, having an outwardly-projecting arm, R, for breaking or pulverizing the soil as the furrow-slice is being turned, as set forth.

5. The combination of the beam, the rocking turning-plow, and the rocking subsoil-plow, said plows being adjustable on the beam as to inclination by means of independent connections, substantially as and for the purposes specified.

6. The combination of the handles, the beam, the subsoil-plow, the turning-plow, their standards provided with collars independently adjustable upon the beam, and the brace upon which the front plow rocks, passing from its heel to the beam, these members being constructed and operating substantially as hereinbefore set forth, whereby the plows may readily be detached from the beam, and either or both of them may be rocked vertically, for the purpose specified.

In testimony whereof I have hereunto subscribed my name.

CHARLES W. FLIPPEN.

Witnesses:
 BALTIS DE LONG,
 F. STITH.